United States Patent
Wu et al.

(10) Patent No.: US 10,820,361 B2
(45) Date of Patent: Oct. 27, 2020

(54) METHOD AND SYSTEM FOR APPLICATION-CONTROLLED MULTIPLE WI-FI CONNECTIONS

(71) Applicant: Samsung Electronics Co., Ltd, Suwon-si (KR)

(72) Inventors: Qian Wu, Overland Park, KS (US); Harsimran Singh, Overland Park, KS (US)

(73) Assignee: Samsung Electronics Co., Ltd., Suwon-si (KR)

(*) Notice: Subject to any disclaimer, the term of this patent is extended or adjusted under 35 U.S.C. 154(b) by 104 days.

(21) Appl. No.: 15/584,817

(22) Filed: May 2, 2017

(65) Prior Publication Data

US 2018/0324874 A1    Nov. 8, 2018

(51) Int. Cl.
| | | |
|---|---|---|
| *H04W 48/18* | (2009.01) |
| *H04W 4/60* | (2018.01) |
| *H04W 76/15* | (2018.01) |
| *H04W 84/12* | (2009.01) |
| *H04M 1/725* | (2006.01) |

(52) U.S. Cl.
CPC .......... *H04W 76/15* (2018.02); *H04W 4/60* (2018.02); *H04W 48/18* (2013.01); *H04M 1/72522* (2013.01); *H04M 2250/06* (2013.01); *H04W 84/12* (2013.01)

(58) Field of Classification Search
CPC ..... H04L 63/0876; H04L 67/16; H04L 67/20; H04L 67/141; H04W 4/50; H04W 12/08; H04W 48/16; H04W 28/085; H04W 72/06; H04W 4/60; H04W 48/18; H04W 76/15; H04W 84/12
USPC .................. 370/252, 328, 329, 331
See application file for complete search history.

(56) References Cited

U.S. PATENT DOCUMENTS

| | | | |
|---|---|---|---|
| 2013/0107882 A1* | 5/2013 | Hirai .................. | H04L 12/18 370/390 |
| 2014/0026192 A1 | 1/2014 | Gatewood et al. | |
| 2016/0234212 A1* | 8/2016 | Huang .............. | H04L 63/0876 |
| 2017/0026874 A1* | 1/2017 | Hassan .............. | H04W 28/085 |
| 2018/0255149 A1* | 9/2018 | Yong .................. | H04L 67/16 |

FOREIGN PATENT DOCUMENTS

| | | |
|---|---|---|
| CN | 103561172 A | 2/2014 |
| WO | 2013155419 A1 | 10/2013 |

* cited by examiner

*Primary Examiner* — Harun Chowdhury (57) ABSTRACT

A method, electronic device, and non-transitory computer readable medium for controlling Wi-Fi channels. The method comprises, in response to identifying an application to be executed, identifying, by the electronic device, available Wi-Fi channels to use for sending and receiving data for the application. The method also includes identifying, by the electronic device, which one of the available Wi-Fi channels to use for sending and receiving the data for the application based on preset mappings between applications and the available Wi-Fi channels.

20 Claims, 8 Drawing Sheets

METHOD AND SYSTEM FOR APPLICATION-CONTROLLED MULTIPLE WI-FI CONNECTIONS

TECHNICAL FIELD

This disclosure relates generally to systems and methods used in and by electronic devices for controlling multiple communication channels, an embodiment of this disclosure relates to control multiple Wi-Fi channels.

BACKGROUND

Wireless Fidelity (Wi-Fi) is a popular wireless communication protocol to obtain a network access. Today, the Wi-Fi is a very common communication protocol to have a Wi-Fi access point in public areas, like grocery stores, airports, restaurants, or transportations like buses, trains, aircrafts, and so on. The Wi-Fi access point broadcasts a server set identification (SSID) that is detected by user devices (e.g., electronic device). The electronic devices then respond to the SSID with an access code that is pre-stored in the Wi-Fi access point through a physical Wi-Fi (network access) interface card built in the electronic devices. Once the electronic devices are connected to a Wi-Fi channel (e.g., Wi-Fi connection) successfully, the SSID and access code are stored on the electronic devices. When the electronic devices approach to the same Wi-Fi access point again in the future and the Wi-Fi connection is automatically established with the same access code. The Wi-Fi connections are available almost everywhere and the electronic devices are capable of storing multiple previously used SSIDs. Therefore, it has been enabled that users are able to select his/her preferred access point to surf the Internet, watch videos or send/receive emails.

SUMMARY

This disclosure provides method and apparatus for application-controlled multiple Wi-Fi channels.

In one embodiment, a method for controlling Wi-Fi channels is provided. The method comprises, in response to identifying an application to be executed, identifying, by an electronic device, available Wi-Fi channels to use for sending and receiving data for the application. The method further comprises identifying, by the electronic device, which one of the available Wi-Fi channels to use for sending and receiving the data for the application based on preset mappings between applications and the available Wi-Fi channels.

In another embodiment, an electronic device is provided. The electronic device includes a memory electrically connected to at least one processor and an at least one processor configured to in response to identifying an application to be executed, identify, by the electronic device, available Wi-Fi channels to use for sending and receiving data for the application, and identify, by the electronic device, which one of the available Wi-Fi channels to use for sending and receiving the data for the application based on preset mappings between applications and the available Wi-Fi channels.

In yet another embodiment, a non-transitory computer readable medium comprising instructions is provided. The non-transitory readable medium comprises instructions, that when executed by at least one processor of an electronic device, cause the electronic device to, in response to identifying an application to be executed, identify available Wi-Fi channels to use for sending and receiving data for the application; and identify which one of the available Wi-Fi channels to use for sending and receiving the data for the application based on preset mappings between applications and the available Wi-Fi channels.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
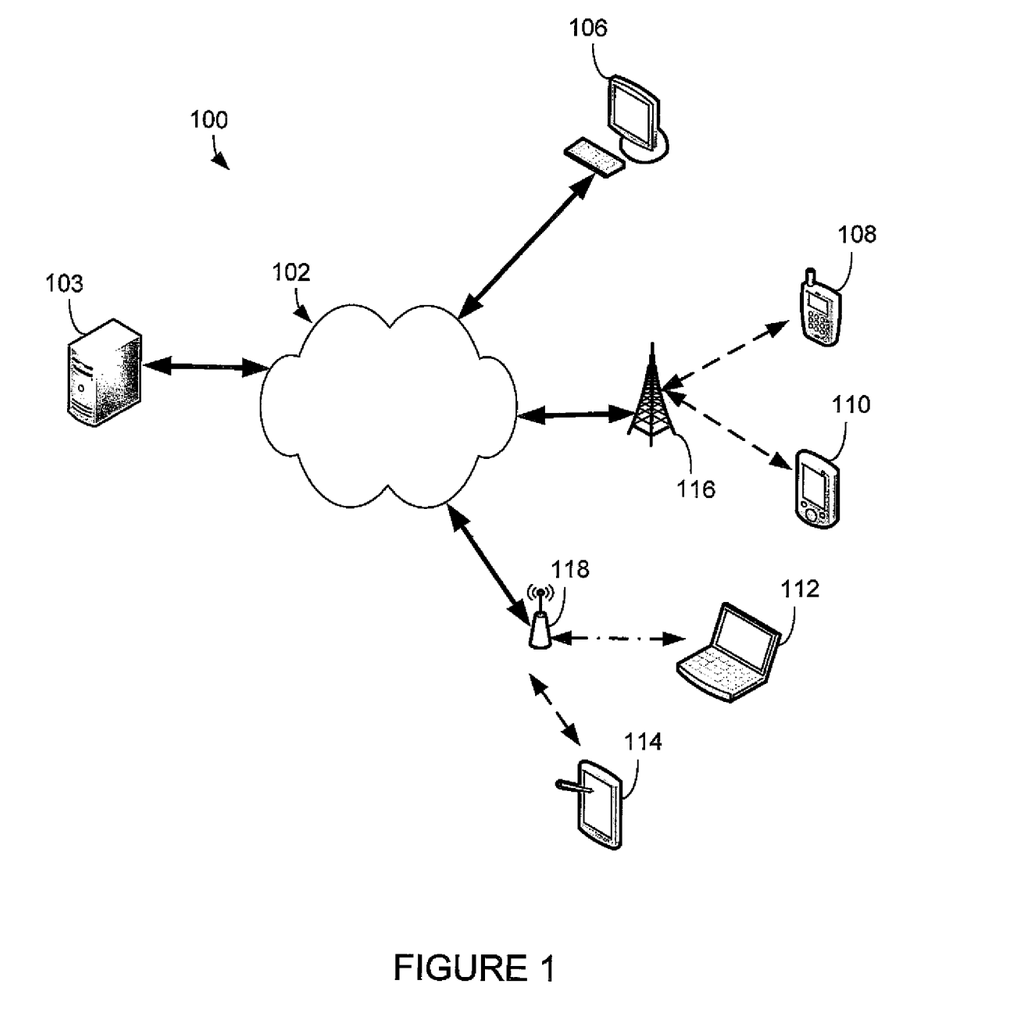
FIG. 1 illustrates an example communication system according to various embodiments of the present disclosure.
Figure 2:
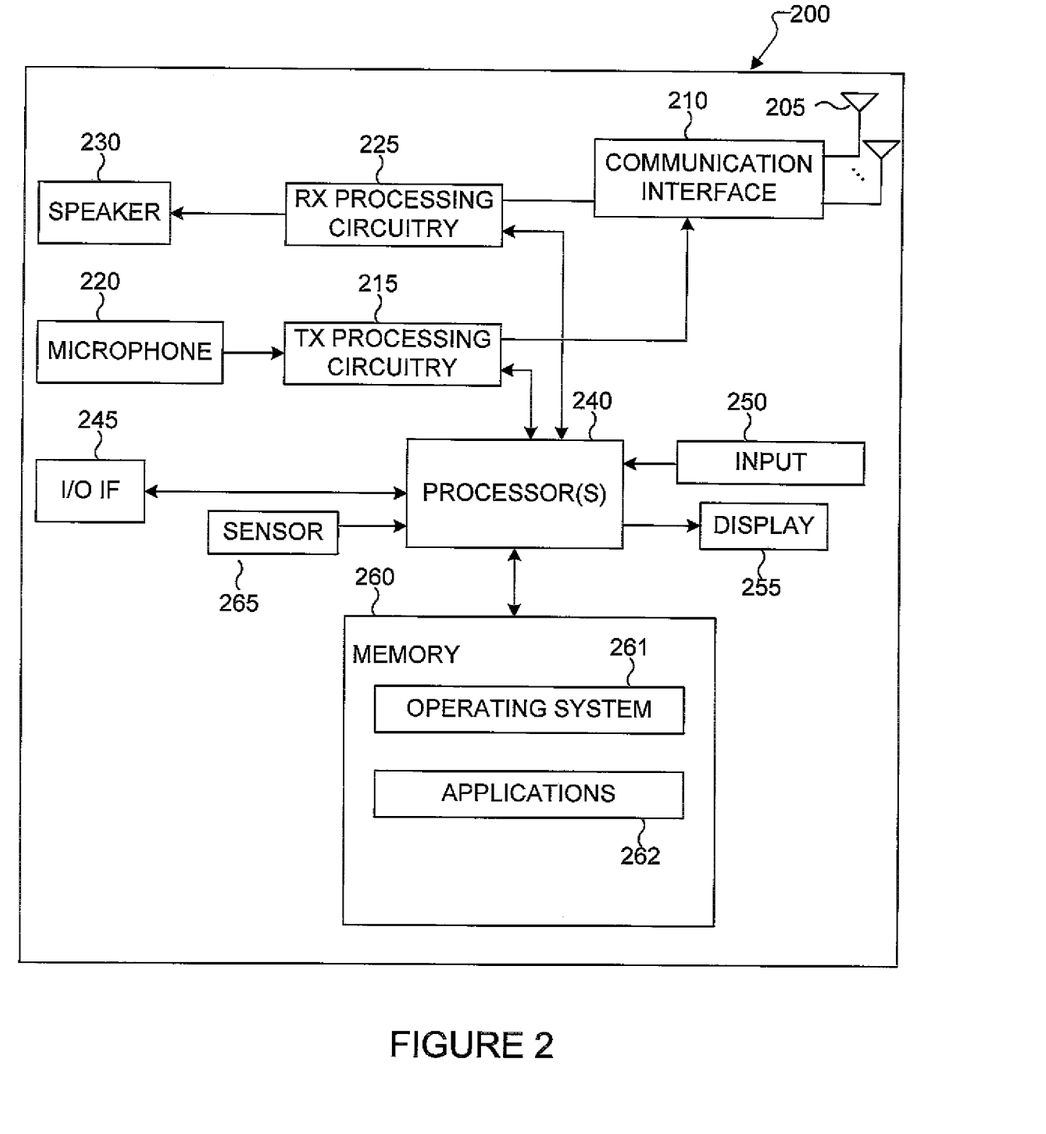
FIG. 2 illustrates an example electronic device according to various embodiments of the present disclosure.

The descriptions of FIGS. 1 and 2 are not meant to imply physical or architectural limitations to the manner in which different embodiments may be implemented. Different embodiments of the present disclosure may be implemented in any suitably-arranged communications system.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, or other information between network addresses. The network 102 may include one or more local area networks (LANs); metropolitan area networks (MANs); wide area networks (WANs); all or a portion of a global network, such as the Internet; or any other communication system or systems at one or more locations.

The network 102 facilitates communications between servers 103 and various electronic devices 106, 108, 110, 112, and 114. The server 103 includes any suitable computing or processing device that can provide computing services for one or more electronic devices. The server 103 could, for example, include one or more processors, one or more memories storing instructions and data, and one or more network interfaces facilitating communication over the network 102.

Each electronic device 106, 108, 110, 112, and 114 represents any suitable computing or communication device that interacts with at least one server or other computing device(s) over the network 102. In this example, the electronic devices 106, 108, 110, 112, and 114 include electronic devices, such as, for example, a desktop computer 106, a mobile telephones or smartphones 108, a personal digital assistant (PDA) 110, a laptop computer 112, a tablet computer 114, a headset, a wearable device, smart watch, etc. However, any other or additional electronic devices could be used in the communication system 100.

In this example, some electronic devices 108, 110, 112, and 114 communicate indirectly with the network 102. For example, the electronic devices 108 and 110 communicate via one or more base stations 16, such as cellular base stations or eNodeBs. Also, the electronic devices 112 and 114 communicate via one or more wireless access points (APs) 118, such as IEEE 802.11 wireless APs, Bluetooth, and Wi-Fi direct. Note that these are for illustration only and that each electronic device could communicate directly with the network 102 or indirectly with the network 102 via any suitable intermediate device(s) or network(s).

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

FIG. 2 illustrates an example electronic device 200 according to embodiments of the present disclosure. The embodiment of the electronic device 200 illustrated in FIG. 2 is for illustration only, and the electronic devices 106, 108, 110, 112, and 114 of FIG. 1 could have the same or similar configuration. However, electronic devices come in a wide variety of configurations, and FIG. 2 does not limit the scope of this disclosure to any particular implementation of an electronic device.

As shown in FIG. 2, the electronic device 200 includes antennas 205, communication unit 210, TX processing circuitry 215, a microphone 220, and receive (RX) processing circuitry 225. The RF communication interface 210 may include, for example, an RF transceiver, a Bluetooth transceiver, or a Wi-Fi transceiver. The electronic device 200 also includes a speaker 230, a processor 240, an input/output (I/O) interface (IF) 245, an input device 250, a display 255, a memory 260, and a sensor 265. The memory 260 includes an operating system (OS) 261 and one or more applications 262.

The communication interface 210 may receive an incoming RF signal such as a Bluetooth signal or a Wi-Fi signal. The communication interface 210 may down-convert the incoming RF signal to generate an intermediate frequency (IF) or baseband signal. In various embodiments, the electronic device 200 establishes Wi-Fi connections using a virtual Wi-Fi architecture that provides multiple virtual WLAN cards using a single wireless local area network (WLAN) card.

The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The communication unit 210 receives the outgoing processed baseband or IF signal from the TX processing circuitry 215 and up-converts the baseband or IF signal to an RF signal that is transmitted via the antenna 205.

The processor 240 can include one or more processors or other processing devices and execute the OS 261 stored in the memory 260 in order to control the overall operation of the electronic device 200. For example, the processor 240 could control the reception of forward channel signals and the transmission of reverse channel signals by the communication unit 210, the RX processing circuitry 225, and the TX processing circuitry 215 in accordance with well-known principles. In some embodiments, the processor 240 includes at least one microprocessor or microcontroller.

The processor 240 is also capable of executing other processes and programs resident in the memory 260, such as processes a diagnostic data for the eNBs 116 and 118 in a wireless communication network 102.

The processor 240 can move data into or out of the memory 260 as required by an executing process. In some embodiments, the processor 240 is configured to execute the applications 262 based on the OS 261 or in response to signals received from eNBs or an operator. The processor 240 is also coupled to the I/O interface 245, which provides the electronic device 116 with the ability to connect to other devices, such as laptop computers and handheld computers. The I/O interface 245 is the communication path between these accessories and the processor 240.

The processor 240 is also coupled to the input device 250 and the display 255. The operator of the electronic device 200 can use the input device 250 to enter data into the electronic device 200. In some embodiment, the input device 250 comprises a circuitry and/or program to recognize fingerprint scanning input from a user and/or user device.

The display 255 may be a liquid crystal display, light emitting diode display, or other display capable of rendering text and/or at least limited graphics, such as from web sites. In some embodiments, the processor 240 is configured to transmit diagnostic data to the eNBs 116 and 118 in the wireless communication network 102.

The memory 260 is coupled to the processor 240. Part of the memory 260 could include a random access memory (RAM), and another part of the memory 260 could include a Flash memory or other read-only memory (ROM). In some embodiments, the memory 260 may store a program code, that when executed by at least one controller/processor 240, causes the at least one processor to transmit diagnostic data to the eNBs 116 and 118 in the wireless communication network 102.

Although FIG. 2 illustrates one example of electronic device 200, various changes may be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). In another example, the electronic device may include an antenna or a set of multiple antennas. Also, while FIG. 2 illustrates the electronic device 200 configured as a mobile telephone or smartphone, electronic devices could be configured to operate as other types of mobile, stationary devices, or electronic devices providing at least one Wi-Fi connection.

An electronic device including a Wi-Fi communication interface is capable of detecting multiple SSID signals at the same time. However not all public SSIDs, especially free connections are secure enough to broadcast user sensitive data. Also, due to different network settings, the gateway may block certain types of network access, e.g. video streaming, game streaming, or content with restrictions. So when the electronic device detects multiple Wi-Fi signals, there is always a need for a user to switch Wi-Fi channels (e.g., connections) for different purposes. For example, user may want to: (1) send and/or receive personal and work related emails, while watching a movie on commercial provide (e.g., Netflix in Starbucks); (2) connect to company's free Wi-Fi services for work relates tasks, but use his own hot-spot device to send and/or receive personal healthcare information; or (3) watch video streaming through a provider (e.g., YouTube video) while placed on a voice over Wi-Fi (VOWIFI) conference call.

Although a device is able to store and manage multiple Wi-Fi access codes, the device rarely has a provision for more than one Wi-Fi connection at the same time, because each connection must be served by each connection's own Wi-Fi network card. Some devices support multiple Wi-Fi network cards (e.g., Google's modular phone), but the devices may still be problematic due to a physical size and shape of the network card, or a need of extra power.

The present disclosure discloses a method to present multiple Wi-Fi channels to be connected simultaneously on a single Wi-Fi network card installed in an electronic device based on a virtual Wi-Fi architecture. Each Wi-Fi channel (e.g., connection) is capable of defining one or multiple applications to use and each application can also define one or multiple Wi-Fi channels to connect each application and channel (e.g., connection). When a user switches between applications, or performs different tasks, the electronic device appears to be always connected to a Wi-Fi channel, but underline switches to the corresponding Wi-Fi channels automatically, based on a predefined configuration and without user's awareness.

A virtual Wi-Fi architecture abstracts a single wireless local area network (WLAN) card to appear as multiple virtual WLAN cards to a representation layer in a communication protocol stack. A user can then configure each virtual channel to connect to a different wireless network. Therefore, it allows a user to simultaneously connect his machine to multiple wireless networks using just one WLAN card.

Figure 3:
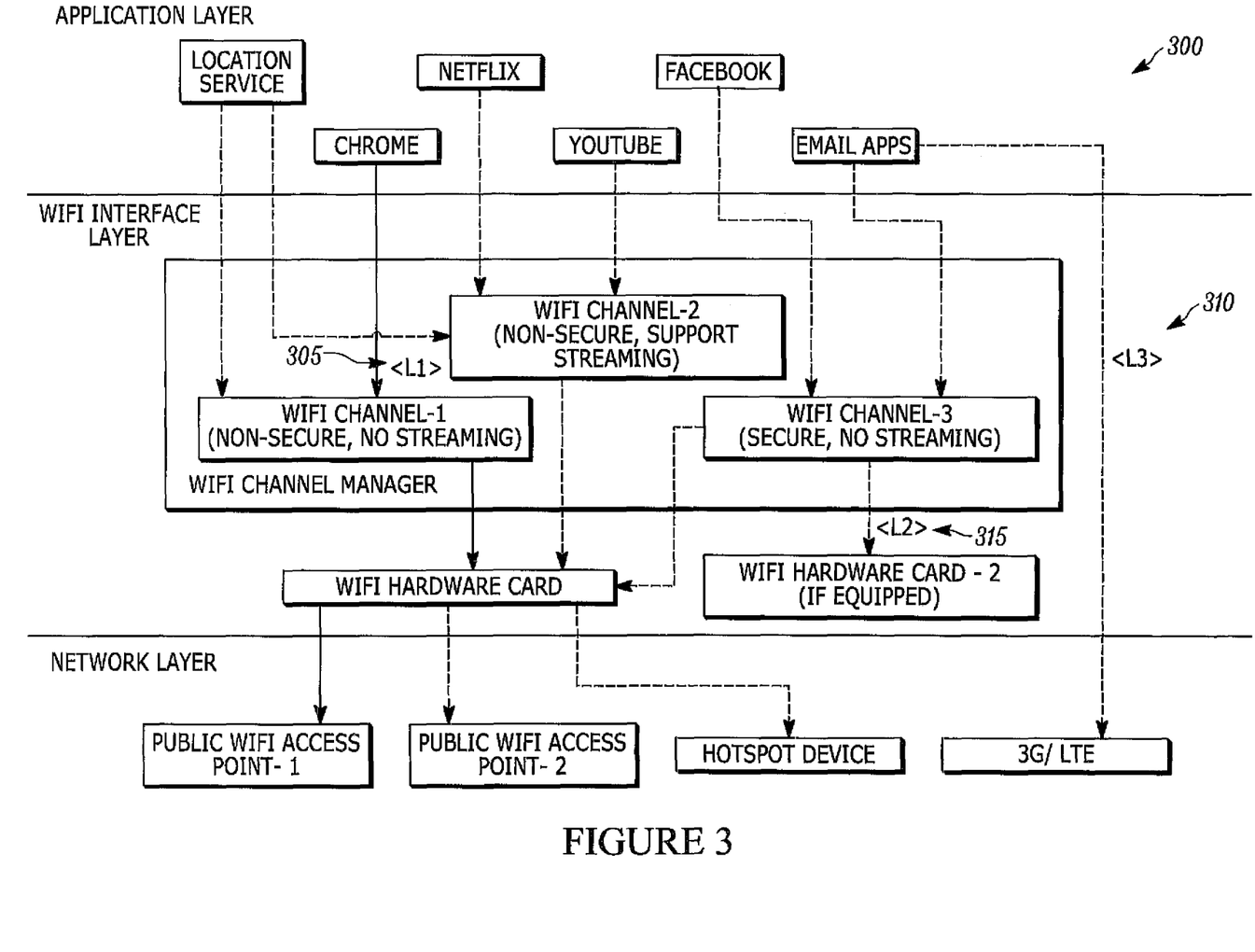
FIG. 3 illustrates an example virtual Wi-Fi architecture according to various embodiments of the present disclosure.

FIG. 3 illustrates an example virtual Wi-Fi architecture 300 according to various embodiments of the present disclosure. The embodiment of the virtual Wi-Fi architecture 300 shown in FIG. 3 is for illustration only. Other embodiments of the virtual Wi-Fi architecture 300 could be used without departing from the scope of this disclosure. As shown in FIG. 3, the virtual Wi-Fi architecture 300 comprises three layers such as a network layer, a Wi-Fi interface layer, and an application layer. The network layer is a Wi-Fi network provider and may be a public Wi-Fi access point, home Wi-Fi router, or a hot-spot device. The Wi-Fi interface layer includes one or multiple physical Wi-Fi network cards and a Wi-Fi channel manager which creates and manages different Wi-Fi channels defined per the application. There may be three Wi-Fi channels.

In one embodiment, a channel-1 305 is a non-secure channel and does not support streaming. In another embodiment, channel-2 315 is non-secure channel and supports a streaming service. In yet another embodiment, channel-3 310 is a secure channel and does not support a streaming service. In the application layer, each application is configured to connect with certain Wi-Fi channels. For example, location service can use the Wi-Fi channel-1 305 and the Wi-Fi channel-2 315, but an email application can only use the Wi-Fi-channel-3 310. In one example, if a current user is using the Chrome app, so the Wi-Fi channel flow is configured to: (1) launch a Chrome application; (2) configure a Wi-Fi Channel-1 305; (3) configure a Wi-Fi hardware card; and (4) configure a public Wi-Fi access point-1 as shown in L1 flow (e.g., 305 shown in FIG. 3).

If multiple Wi-Fi network cards are implemented in an electronic device, the Wi-Fi channel manager may be able to take advantage of the multiple Wi-Fi network cards as shown in the flow L2 (e.g., 315 as shown in FIG. 3).

If a configured Wi-Fi channel is not available, an application may be able to use regular 3G/4G LTE data service as well as shown in the flow L3 (e.g., 310 as shown in FIG. 3).

A user may be able to view, add, and delete applications associated with each Wi-Fi channel using a pre-configured setting (e.g., a Wi-Fi screen through settings).

Figure 4:
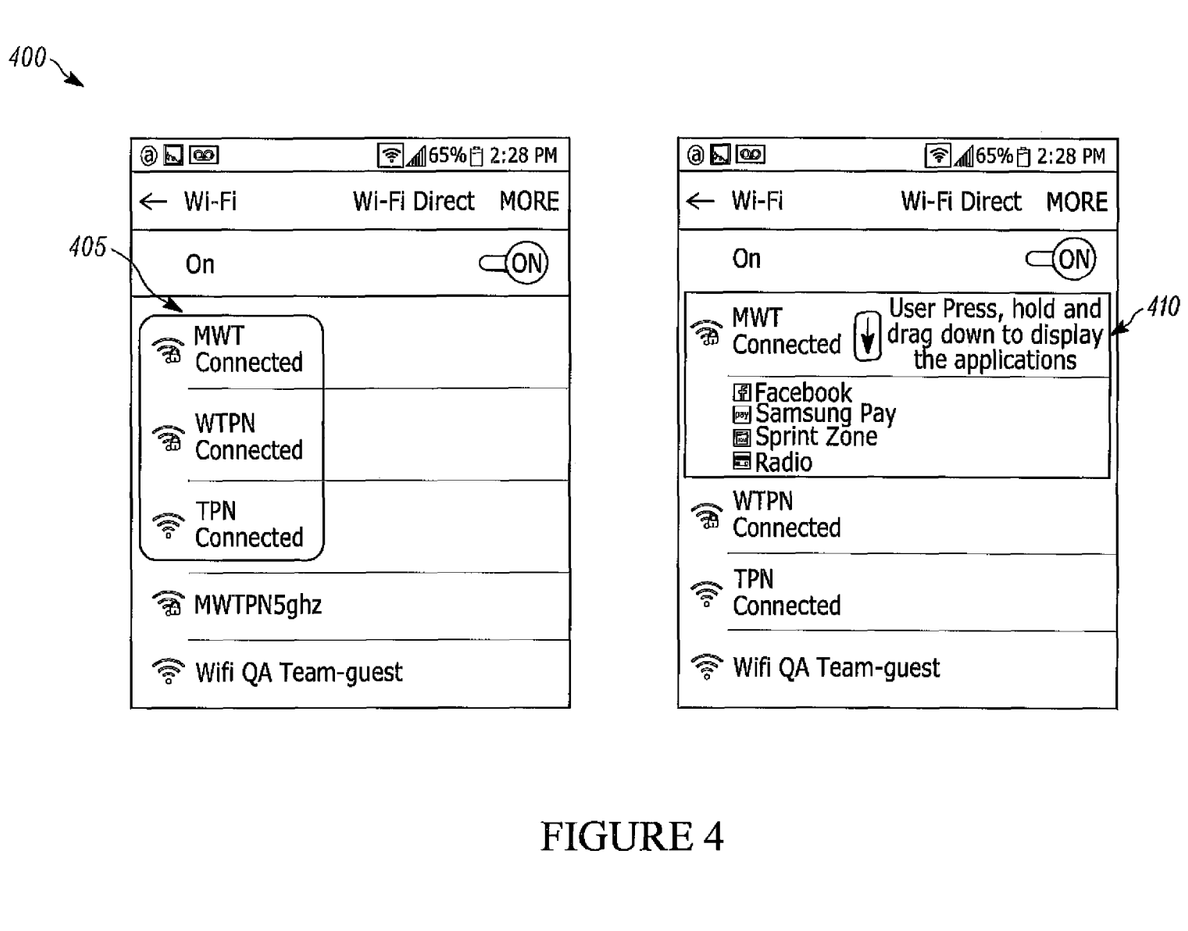
FIG. 4 illustrates an example displaying associated with each connected Wi-Fi channel according to various embodiments of the present disclosure.

FIG. 4 illustrates an example displaying associated with each connected Wi-Fi channel 400 according to various embodiments of the present disclosure. The embodiment of the displaying associated with each connected Wi-Fi channel 400 shown in FIG. 4 is for illustration only. Other embodiments of the displaying associated with each connected Wi-Fi channel 400 could be used without departing from the scope of this disclosure. As shown in FIG. 4, the displaying associated with connected Wi-Fi channel 400 comprises a list of available Wi-Fi channels 405 and a list of available applications 410. More specifically, the list of the available Wi-Fi channel 405 comprises specific SSID names (e.g., MWT, WTRN, TPN) of the available Wi-Fi channels and the list of the available applications 410 comprises specific application names (e.g., Facebook, Samsung pay etc.) to be executed on the electronic device 200.

As shown in FIG. 4, when a user clicks one channel from the list of the available Wi-Fi channels 405 and performs a swiping down gesture, the list of the available applications 410 associated with this channel may be displayed. When a user clicks one channel, it may allow the user to add or remove applications to or from the Wi-Fi channel (e.g., connection).

Figure 5:
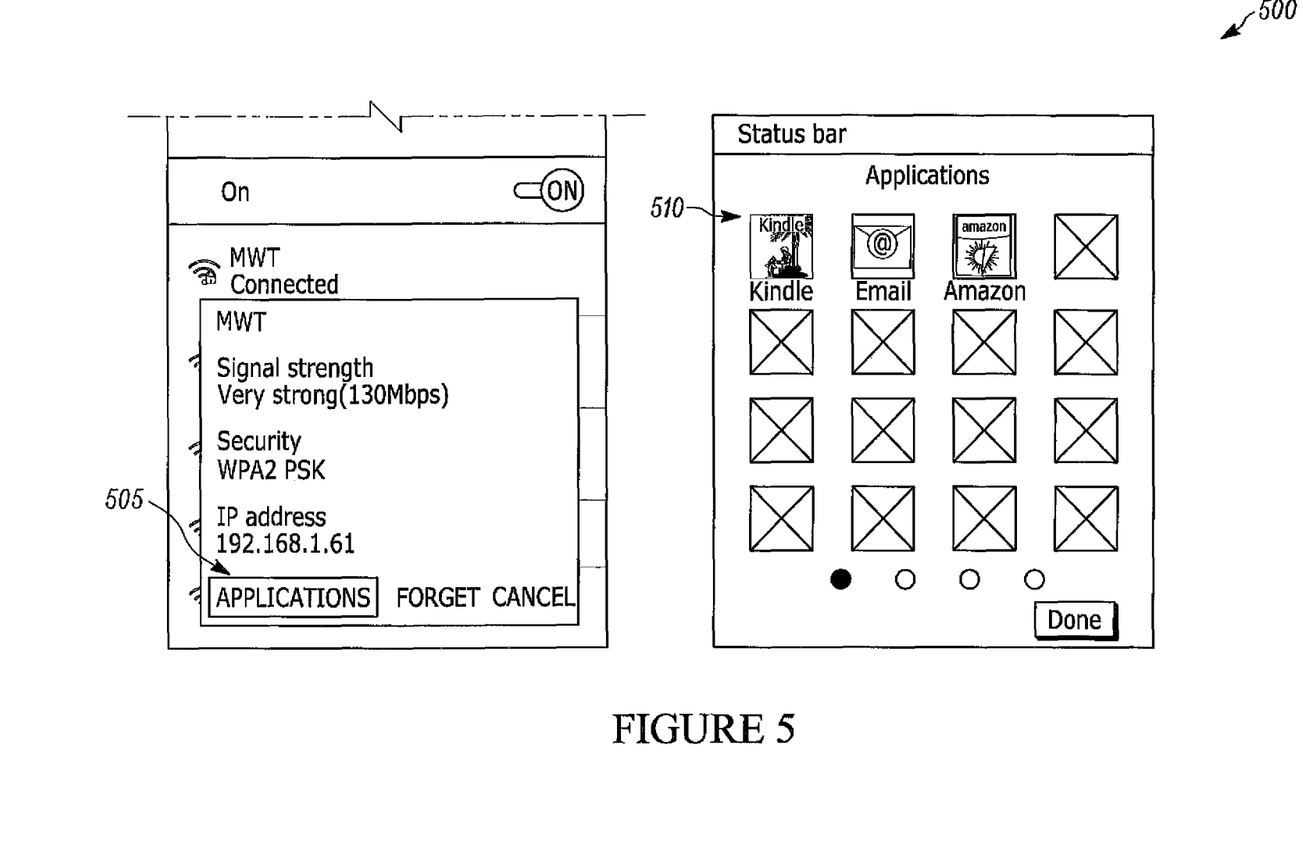
FIG. 5 illustrates an example adding and removing of application from Wi-Fi channel according to various embodiments of the present disclosure.

FIG. 5 illustrates an example adding and removing of application from Wi-Fi channel 500 according to various embodiments of the present disclosure. The embodiment of the adding and removing of application from Wi-Fi channel 500 shown in FIG. 5 is for illustration only. Other embodiments of the adding and removing of application from Wi-Fi channel 500 could be used without departing from the scope of this disclosure. As shown in FIG. 5, the adding and removing of the application from Wi-Fi channel 500 comprises an icon 505 (e.g., any type of character or symbol) to execute a command from a user of the electronic device 200 and an dialog window 510 showing a list of applications.

Each application can be configured to multiple Wi-Fi channels or mobile data depending upon user preferences.

In some embodiments, if a user performs a double tapping the icon 505 (e.g., "applications" as shown in FIG. 5), the dialog window 510 may pop up as shown in FIG. 5. And the user is able to enlist the preferences to available Wi-Fi networks and mobile data in accordance with the dialog window 510 including at least one available application to be executed in the electronic device 200.

Figure 6:
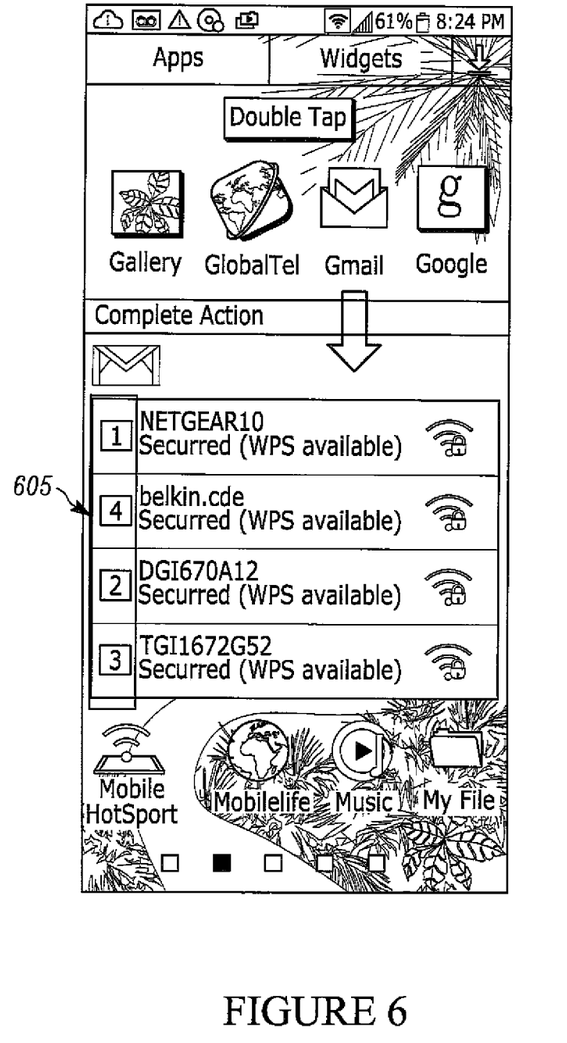
FIG. 6 illustrates an example application setup according to various embodiments of the present disclosure.

FIG. 6 illustrates an example application setup 600 according to various embodiments of the present disclosure. The embodiment of the application setup 600 shown in FIG. 6 is for illustration only. Other embodiments of the application setup 600 could be used without departing from the scope of this disclosure. As shown in FIG. 6, the application setup 600 comprises an ordering 605. More specifically, the ordering includes at least one integer number, for example, "1" for "NETREARIO", "4" for "belkin.cde", "2" for "DG1670A12", and "3" for "TG1672G52" as shown in FIG. 6.

In some embodiments, a user may prioritize a use of available multiple Wi-Fi channels by providing numeric values to those Wi-Fi channels as shown in left to SSID of available channels (e.g., FIG. 6). The lower numeric value comprises a higher priority and the application may try to use the Wi-Fi channel first ranked as the higher priority than others with higher numeric values. If the channel with highest priority is not available, then the application may try to use other Wi-Fi channels depending upon the priority given by the user in a sequential manner.

As shown in FIG. 6, the mobile icon on the top-right corner indicates a usage of mobile data. Toggling this icon allows user to use or not use mobile data when none of the Wi-Fi channels are available.

In some embodiments, as a default, each new Wi-Fi channel is allowed for all applications. So when there's a new Wi-Fi channel available, a user may not configure the applications for the Wi-Fi channel before use.

In some embodiments, if multiple applications requiring different Wi-Fi channels are both in foreground (multi-window), or one running as an active service, a user may have an option to choose which Wi-Fi channel is used when a single Wi-Fi network card is available, or Wi-Fi+$3^{rd}$ generation/$4^{th}$ generation (3G/4G).

In some embodiments, when a high priority Wi-Fi channel is available to an active application, the high priority Wi-Fi channel may automatically switch to use the high priority channel in the background.

In some embodiments, when a Wi-Fi channel is disconnected or out of range, an application using the Wi-Fi channel may automatically search and switch to the next priority Wi-Fi channel, or data plan to use.

Figure 7:
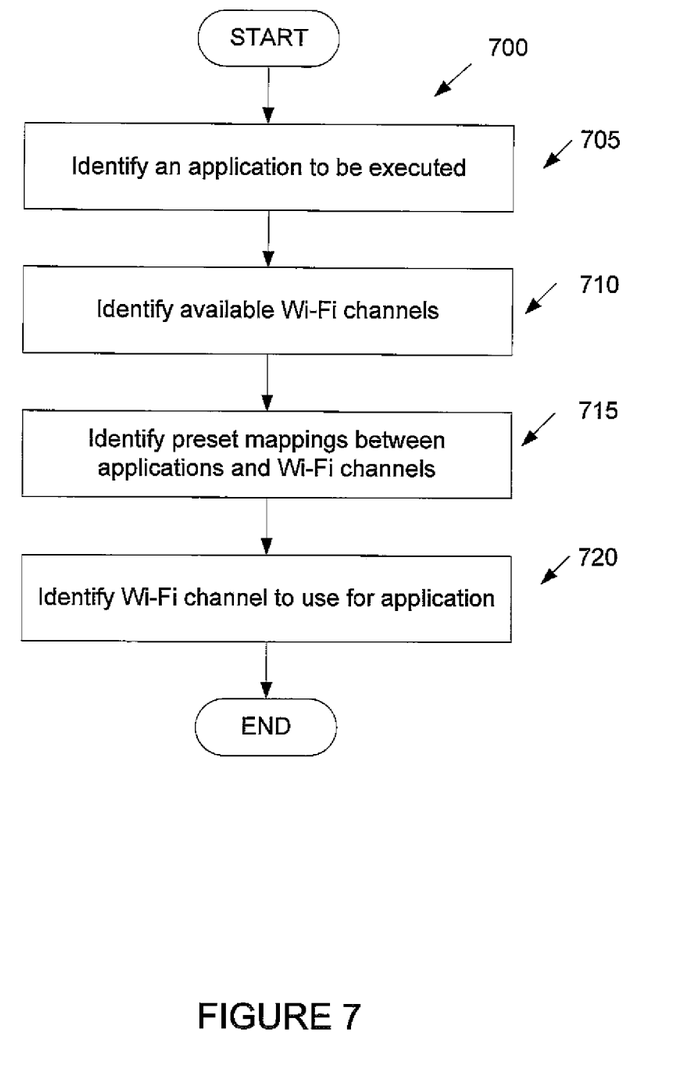
FIG. 7 illustrates a process for controlling Wi-Fi channels according to various embodiments of the present disclosure.

FIG. 7 illustrates a process 700 for controlling Wi-Fi channels according to various embodiments of the present disclosure. The process 700 depicted in FIG. 7 may be performed by the electronic device 200. The embodiment of the process 700 shown in FIG. 7 is for illustration only. Other embodiments of the process 700 could be used without departing from the scope of this disclosure.

The process for controlling Wi-Fi channels begins with the electronic device 200. The electronic device 200 identifies, in step 705, an application that can be executed on the electronic device 200. For example, in step 705, the electronic device 200 identifies any type of applications or programs that have been installed and can be executed on the electronic device 200. For example, in step 705, the available applications can be displayed as an icon or any type of characters of symbols on the screen of the electronic device.

Next, the electronic device 200, in step 710, identifies available Wi-Fi channels for sending and receiving data using the identified application in step 705. For example, in step 710, the electronic device may identify available Wi-Fi channels that can be used for the application based on preset or dynamically configured criteria such as signal strength or privacy policy. In one embodiment, when the electronic device 200 comprises a single Wi-Fi card, the electronic device 200 uses the virtual architecture as shown in FIG. 3 to provide multiple Wi-Fi channels. In another embodiment, when the electronic device 200 comprises multiple Wi-Fi cards (e.g., Wi-Fi interface card, Wi-Fi adopter), the electronic device 200 provides multiple Wi-Fi channels through the multiple Wi-Fi cards. In step 710, the available Wi-Fi channel can be displayed as an icon or any type of symbols or characters on the screen of the electronic device 200.

Subsequently, in the step 715, the electronic device 200 identifies preset mappings between the identified applications in step 705 and the identified available Wi-Fi channels in step 710. For example, in step 715, the electronic device 200 uses the preset mapping to map the different applications to different Wi-Fi channels based on signal strength of each Wi-Fi channel (e.g., connection) or a privacy policy that is applied to different Wi-Fi networks.

Finally, in step 720, the electronic device 200 identifies the Wi-Fi channel to use for the application to be executed in the electronic device 200. For example, in step 715, the electronic device 200 generates an ordering for the available Wi-Fi channels. In one embodiment, a user of the electronic device 200 may prioritize a use of available multiple Wi-Fi channels by providing numeric values to those Wi-Fi channels. In one example, the lower numeric value comprises a higher priority and the application may try to use the Wi-Fi channel first ranked as the higher priority than others with higher numeric values. In another example, if the channel with highest priority is not available, then the application may try to use other Wi-Fi channels depending upon the priority given by the user in a sequential manner.

Figure 8:
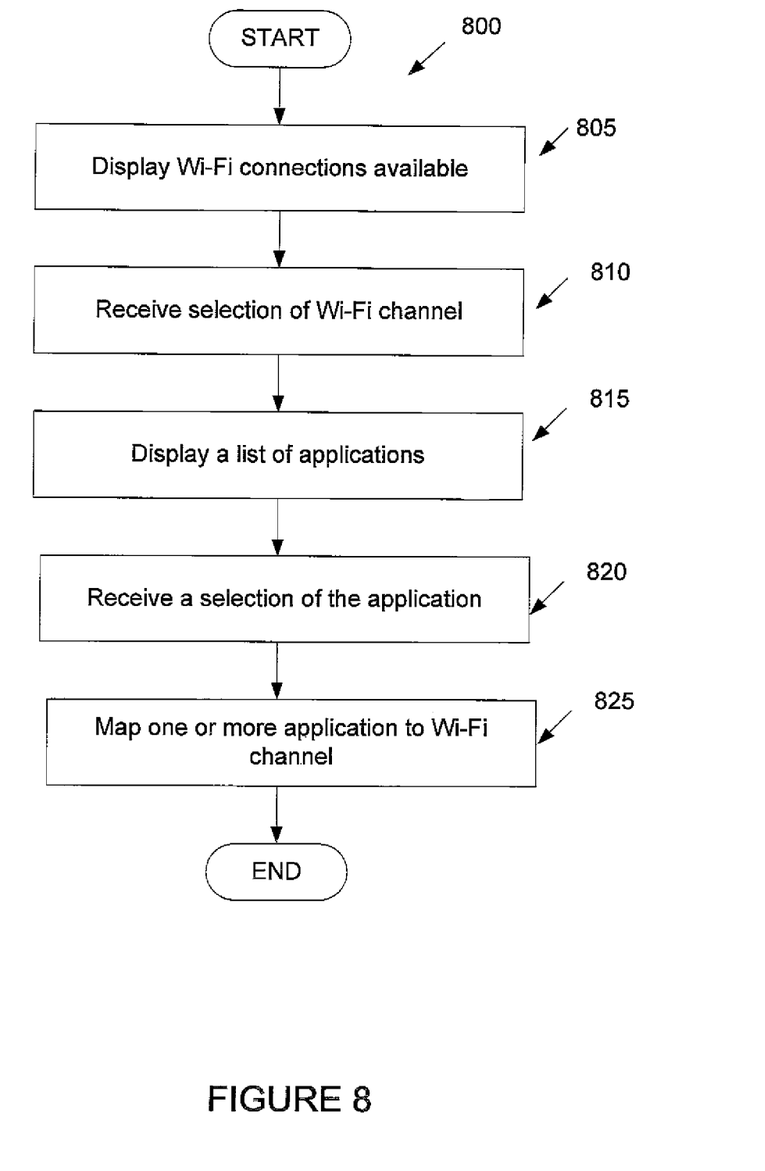
FIG. 8 illustrates another process for controlling Wi-Fi channels according to various embodiments of the present disclosure.

FIG. 8 illustrates another process 800 for generating preset mappings for controlling Wi-Fi channels according to various embodiments of the present disclosure. The process 800 depicted in FIG. 8 may be performed by the electronic device 200. The embodiment of the process 800 shown in FIG. 8 is for illustration only. Other embodiments of the process 800 could be used without departing from the scope of this disclosure.

The process for generating preset mappings for controlling Wi-Fi channels begins with the electronic device 200. For example, the electronic device 200 uses previous mapping history or pre-stored mapping configuration. In one example, the electronic device 200 uses mapping information that is dynamically configured from the Wi-Fi network. In another example, the electronic device 200 generates the preset mapping between the applications and the available Wi-Fi channels based on a privacy policy. In yet another example, the electronic device 200 generates the preset mappings between the applications and the available Wi-Fi channels based on signal strength of each available Wi-Fi channels between the electronic device 200 and access points (e.g., Wi-Fi networks).

In step 805, the electronic device 200 displays available Wi-Fi channels for the applications to be executed in the electronic device 200. In one example, the available Wi-Fi channel is displayed as an icon or any type of symbols or characters on the screen of the electronic device 200. In another example, the available Wi-Fi channels are ordered based on the priority for connecting the available application to available Wi-Fi channels.

Next, in step 810, the electronic device 200 receives a selection of one of the available Wi-Fi channels. For example, a user of the electronic device may select one of available Wi-Fi channels based on privacy policy or signal strength between the electronic device 200 and access points (e.g., 116 and 118 as shown in FIG. 1).

Subsequently, in step 815, the electronic device 200 displays a list of applications to be mapped to the Wi-Fi channels. For example, in step 815, the electronic device 200, in response to the selection of the one of the Wi-Fi channels, displays icons for applications that are mapped to the selected Wi-Fi channel and at least one button to remove one or more applications from the applications mapped to the selected Wi-Fi channel. In one example, the electronic device displays at least one button to add one or more applications to the selected Wi-Fi channel.

Subsequently, in step 820, the electronic device 200 receives a selection of the applications for mapping with the available Wi-Fi channel. Finally, in step 825, the electronic device 200 maps the one or more selected applications to the selected Wi-Fi channel for sending and receiving data.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for controlling Wi-Fi channels, the method comprising:
   in response to identifying an application to be executed, identifying, by an electronic device, available Wi-Fi channels to use for sending and receiving data for the identified application;
   identifying, by the electronic device, which one of the available Wi-Fi channels to use for sending and receiving the data for the identified application based on preset mappings between applications and the available Wi-Fi channels, the preset mappings including, for each of the applications, a numerical ordering of priorities assigned to each of the available Wi-Fi channels;
   switching, from an initial Wi-Fi channel corresponding to an initial application, to the identified available Wi-Fi channel corresponding to the identified application based on the preset mappings, wherein the initial Wi-Fi channel is not identified as being available for the identified application; and
   sending or receiving the data for the identified application using the identified available Wi-Fi channel.

2. The method of claim 1, further comprising generating at least part of the preset mappings by:
   displaying the Wi-Fi channels available for use;
   in response to a selection of one of the Wi-Fi channels, displaying a list of applications; and
   in response to receiving one or more selections of the displayed applications, mapping the one or more selected applications to the selected Wi-Fi channel to be used when the one or more selected applications are executed.

3. The method of claim 2, further comprising:
   in response to the selection of the one of the Wi-Fi channels, displaying icons for applications that are mapped to the selected Wi-Fi channel and at least one button to remove one or more applications from the applications mapped to the selected Wi-Fi channel; and in response to the at least one button being selected, removing at least one of the one or more applications from the applications mapped to the selected Wi-Fi channel.

4. The method of claim 1, further comprising displaying the numerical ordering, based on the assigned priorities, of the available Wi-Fi channels for each of the applications.

5. The method of claim 4, further comprising displaying a selection order, wherein the identified application is used with different Wi-Fi channels based on the numerical ordering associated with the identified application.

6. The method of claim 1, further comprising generating the preset mappings based on a privacy policy.

7. The method of claim 1, further comprising generating the preset mappings based on signal strength of each of the available Wi-Fi channels.

8. An electronic device comprising:
a memory; and
at least one processor electrically connected to the memory, the at least one processor configured to:
in response to identifying an application to be executed, identify available Wi-Fi channels to use for sending and receiving data for the identified application;
identify which one of the available Wi-Fi channels to use for sending and receiving the data for the identified application based on preset mappings between applications and the available Wi-Fi channels, the preset mappings including, for each of the applications, a numerical ordering of priorities assigned to each of the available Wi-Fi channels;
switch, from an initial Wi-Fi channel corresponding to an initial application, to the identified available Wi-Fi channel corresponding to the identified application based on the preset mappings, wherein the initial Wi-Fi channel is not identified as being available for the identified application; and
send or receive the data for the identified application using the identified available Wi-Fi channel.

9. The electronic device of claim 8, wherein the at least one processor is further configured to generate at least part of the preset mappings by:
controlling a display of the electronic device to display the Wi-Fi channels available for use;
in response to a selection of one of the Wi-Fi channels, controlling the display to display a list of applications; and
in response to receiving one or more selections of the displayed applications, mapping the one or more selected applications to the selected Wi-Fi channel to be used when the one or more selected applications are executed.

10. The electronic device of claim 9, wherein the at least one processor is further configured to:
in response to the selection of the one of the Wi-Fi channels, control the display to display icons for applications that are mapped to the selected Wi-Fi channel and at least one button to remove at least one of the one or more applications from the applications mapped to the selected Wi-Fi channel; and
in response to the at least one button being selected, remove at least one of the one or more applications from the applications mapped to the selected Wi-Fi channel.

11. The electronic device of claim 8, wherein the at least one processor is further configured to control a display of the electronic device to display the numerical ordering, based on the assigned priorities, of the available Wi-Fi channels for each of the applications.

12. The electronic device of claim 11, wherein the at least one processor is further configured to control the display of the electronic device to display a selection order, wherein the identified application is used with different Wi-Fi channels based on the numerical ordering associated with the identified application.

13. The electronic device of claim 8, wherein the at least one processor is further configured to generate the preset mappings based on a privacy policy.

14. The electronic device of claim 8, wherein the at least one processor is further configured to generate the preset mappings based on signal strength of each of the available Wi-Fi channels.

15. A non-transitory computer readable medium comprising instructions that, when executed by a processor of an electronic device, cause the processor to:
identify, in response to identifying an application to be executed, available Wi-Fi channels to use for sending and receiving data for the identified application;
identify which one of the available Wi-Fi channels to use for sending and receiving the data for the identified application based on preset mappings between applications and the available Wi-Fi channels, the preset mappings including, for each of the applications, a numerical ordering of priorities assigned to each of the available Wi-Fi channels;
switch, from an initial Wi-Fi channel corresponding to an initial application, to the identified available Wi-Fi channel corresponding to the identified application based on the preset mappings, wherein the initial Wi-Fi channel is not identified as being available for the identified application; and
send or receive the data for the identified application using the identified available Wi-Fi channel.

16. The non-transitory computer readable medium of claim 15, further comprising instructions that, when executed by the processor, cause the processor to generate at least part of the preset mappings by:
controlling a display of the electronic device to display the Wi-Fi channels available for use;
in response to a selection of one of the Wi-Fi channels, controlling the display to display a list of applications; and
in response to receiving one or more selections of the displayed applications, mapping the one or more selected applications to the selected Wi-Fi channel to be used when the one or more selected applications are executed.

17. The non-transitory computer readable medium of claim 16, further comprising instructions that, when executed by the processor, cause the processor to:
control the display to, in response to the selection of the one of the Wi-Fi channels, display icons for applications that are mapped to the selected Wi-Fi channel and at least one button to remove one or more applications from the applications mapped to the selected Wi-Fi channel; and
in response to the at least one button being selected, remove at least one of the one or more applications from the applications mapped to the selected Wi-Fi channel.

18. The non-transitory computer readable medium of claim 15, further comprising instructions that, when executed by the processor, cause the processor to:

control a display of the electronic device to display the numerical ordering of the available Wi-Fi channels for each of the applications.

19. The non-transitory computer readable medium of claim 15, further comprising instructions that, when executed by the processor, cause the processor to generate the preset mappings based on a privacy policy.

20. The non-transitory computer readable medium of claim 15, further comprising instructions that, when executed by the processor, cause the processor to generate the preset mappings based on signal strength of each of the available Wi-Fi channels.

* * * * *